(12) United States Patent
Marangoni et al.

(10) Patent No.: US 6,628,378 B1
(45) Date of Patent: Sep. 30, 2003

(54) METHODS AND APPARATUS FOR ALIGNING ROLLS

(75) Inventors: Roy D. Marangoni, Pittsburgh, PA (US); Patrick Smolinski, Wexford, PA (US); Mark V. Loen, Steubenville, OH (US)

(73) Assignees: University of Pittsburgh, Pittsburgh, PA (US); Weirton Steel Corporation, Weirton, WV (US)

( * ) Notice: Subject to any disclaimer, the term of this patent is extended or adjusted under 35 U.S.C. 154(b) by 0 days.

(21) Appl. No.: 09/436,161

(22) Filed: Nov. 9, 1999

(51) Int. Cl.⁷ .............................. G01C 1/00; G01C 21/06
(52) U.S. Cl. ..................... 356/150; 356/152.2; 33/286
(58) Field of Search ................................. 356/399, 150, 356/153, 152.3; 33/286

(56) References Cited

U.S. PATENT DOCUMENTS

| | | | |
|---|---|---|---|
| 3,923,402 A | 12/1975 | Turcotte | 356/1 |
| 4,298,281 A | 11/1981 | Schave | 356/138 |
| 4,319,406 A | 3/1982 | Pehrson, Sr. et al. | 33/295 |
| 5,026,998 A * | 6/1991 | Hoelzl | 250/561 |
| 5,430,539 A * | 7/1995 | Lysen | 356/152 |
| 5,554,262 A | 9/1996 | Turner | 162/198 |
| 6,040,903 A * | 3/2000 | Lysen et al. | 356/153 |
| 6,049,378 A * | 4/2000 | Bush | 356/138 |
| 6,172,758 B1 * | 1/2001 | Livingston | 356/399 |

* cited by examiner

Primary Examiner—Frank G. Font
Assistant Examiner—Layla Lauchman
(74) Attorney, Agent, or Firm—Reed Smith LLP

(57) ABSTRACT

Apparatus and methods for aligning rolls, wherein a first structure, for being associated with a first roll, and a second structure, for being associated with a second roll are provided. A laser is associated with one of the two structures and a target is associated with the other of the two structures. The two structures, the laser and the target are adapted to indicate whether the two rolls exhibit an aligned condition with respect to one another. Also contemplated is a calibration unit for calibrating an alignment device, wherein the unit itself includes two model rolls.

43 Claims, 3 Drawing Sheets

METHODS AND APPARATUS FOR ALIGNING ROLLS

FIELD OF THE INVENTION

The present invention generally relates to methods and apparatus for aligning rolls bearing strip material, e.g., in steel mills, paper mills, etc.

BACKGROUND OF THE INVENTION

In industries where the rolling of thin strip material such as sheet metal, paper, film or fabric is encountered, a very important consideration is proper alignment of the roll system which transports the material. Improper roll alignment leads to the strip material moving laterally on the rolls, thereby wandering off the rolls completely or causing wrinkling of the material, which could cause material damage or stoppage of production.

Conventionally, when rolls need to be aligned, a plant may need to hire an outside survey team. The survey team is typically contracted to align the rolls through a complicated measurement and leveling process. The procedure is generally as follows:
1) Find the offset reference centerline. Level and align the transit to this offset reference centerline.
2) Rotate the transit exactly 90 degrees using the electronic indicator.
3) Place the center head on the top of the roll and verify that it is level.
4) Hook the steel tape on the top of the roll center head. Take a reading at each end of the roll.
5) Place the steel ruler against the side of the roll. Hold a level against the edge of the steel ruler to ensure that the ruler is level.
6) Slowly wave the ruler towards or away from the transit and take the minimum reading. This must be done on both ends of the roll that is being measured.
7) Compare the readings to determine the alignment of the rolls.
8) Place a machinist's level, accurate up to 0.005 inches per foot, on the roll. Align the bubble to the middle of the level.

This process, however, can often be flawed, as there are many sources of error within the survey team's system. For example, the measurements tend to begin with a tripod placed on the plant's floor. This floor is assumed to be flat and level, which it may or may not actually be. Additionally, many measurements are taken relative to the previous measurements, allowing the error to propagate throughout the system. Clearly, there can also be a large amount of human error incurred in this process.

In the steel industry, the alignment tolerance for rolls must be kept very tight. In one industry standard, the rolls may not be misaligned by any more than 0.006 inches per foot of roll length. This means, for example, that a three-foot roll may be offset by no more than 0.018 inches in order to ensure a high-quality product. Currently, survey teams have been known to be inaccurate by as much as 0.250 inches per foot, which is over 40 times the tolerance just described.

Since the production line cannot operate during the roll alignment procedure, a rapid alignment method is also desirable. However, due to the complicated nature of the survey method just described, roll alignment can be very time consuming. Also, the usually high expense necessary to hire a survey crew is another major drawback to such conventional methods.

In view of the foregoing, a need has been recognized in connection with providing a system for aligning rolls that is quick, efficient and relatively inexpensive.

SUMMARY OF THE INVENTION

The present invention, in accordance with at least one presently preferred embodiment, broadly contemplates a rapid, inexpensive method for the alignment of rollers used in rolling operations and is intended to solve, inter alia, alignment problems in steel mills, paper mills, and in other venues involving the manufacture of a product that must be rolled or the handling and transport of strip material.

Generally, at least one presently preferred embodiment of the present invention broadly contemplates apparatus for aligning rolls, the apparatus comprising: a first structure for being associated with a first roll; a second structure for being associated with a second roll; a laser associated with one of the first and second structures; and a target associated with the other of the first and second structures; the first structure, the second structure, the laser and the target being adapted to indicate whether the first and second rolls exhibit an aligned condition with respect to one another.

Further, at least one presently preferred embodiment of the present invention broadly contemplates a method of aligning rolls, the method comprising: providing a first structure for being associated with a first roll; providing a second structure for being associated with a second roll; providing a laser associated with one of the first and second structures; providing a target associated with the other of the first and second structures; and employing the first structure, the second structure, the laser and the target to indicate whether the first and second rolls exhibit an aligned condition with respect to one another.

Finally, but not necessarily exclusively, at least one presently preferred embodiment of the present invention broadly contemplates a calibration unit for calibrating apparatus for aligning rolls, the calibration unit comprising: a first roll; a second roll; the first and second rolls exhibiting an aligned condition with respect to one another; a first structure associated with the first roll; a second structure associated with the second roll; a laser associated with one of the first and second structures; and a target associated with the other of the first and second structures; the first structure, the second structure, the laser and the target being adapted to indicate the aligned condition of the first and second rolls.

BRIEF DESCRIPTION OF THE DRAWINGS

The present invention and its presently preferred embodiments will be better understood by way of reference to the detailed disclosure herebelow and to the accompanying drawings, wherein.

DESCRIPTION OF THE PREFERRED EMBODIMENTS

Figure 1:
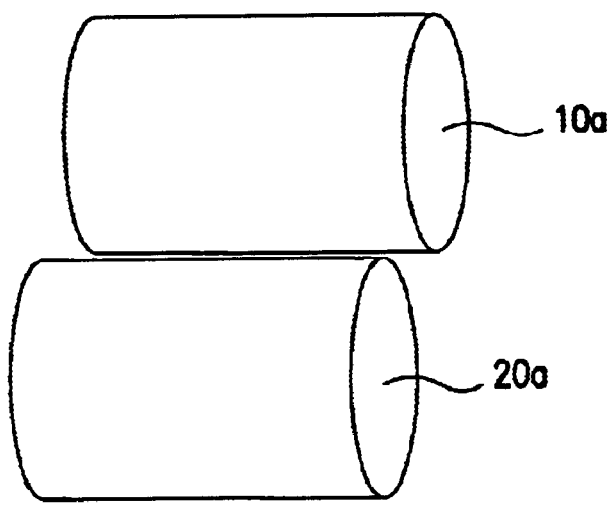
FIG. 1 is a schematic representation of two rolls in alignment.

Typically, rolls are held in place by pillow blocks or other support devices on each end. The rolls typically aligned with each other along the centerline. The rolls are to be aligned with each other in every direction, and held to strict tolerances. Properly aligned rolls 10a, 20a are shown in FIG. 1.

Figure 2:
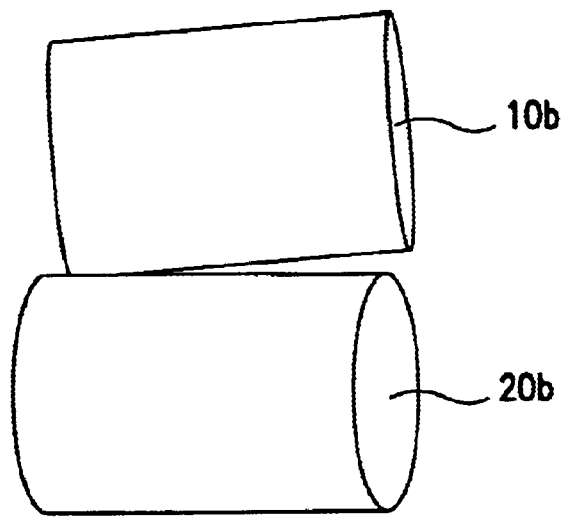
FIG. 2 is a schematic representation of two rolls out of alignment.

With time, the pillow blocks or other support devices begin to wear away and, as they wear, the rolls gradually become misaligned with each other. An example of misaligned rolls 10b, 20b is shown in FIG. 2. Note, however, that the misalignment in FIG. 2 is drastically exaggerated for illustration purposes. Actual roll misalignment in a manufacturing facility is usually so slight that it cannot be detected by the human eye.

Thus, rolls must be accurately aligned at least for quality purposes. When the product (i.e. sheet metal, paper, etc.) passes over or through misaligned rolls, different types of defects tend to arise. Misaligned rolls can induce undesired stresses into sheet metals, for example. The can also cause folding or buckling of the product. In rolling operations, it is vital that the rolls be accurately aligned in order to ensure a high-quality product.

Figure 3:
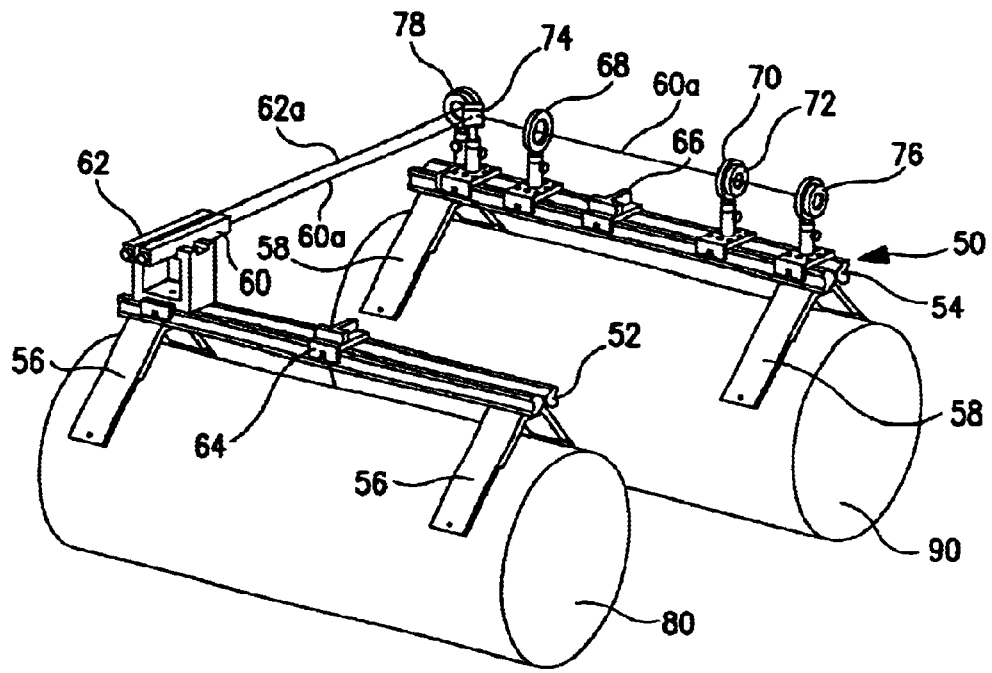
FIG. 3 is a perspective view of a laser alignment system.

In accordance with at least one presently preferred embodiment of the present invention, FIG. 3 illustrates an alignment unit (or alignment device) 50. Shown are two precision optical rails 52 and 54, preferably three feet in length, that are each supported by a respective pair of V-shaped legs 56, 58. The shape of the legs and length of the rails are not critical to the operation of the device, thus, other leg geometries and rail lengths can of course be used. The rails are preferably made of anodized aluminum and are machined very accurately. They are also relatively lightweight, but sturdy enough not to deflect significantly under the loading caused by optical components (discussed below) placed onto the rails. The optical components can be placed on carriers that can be quickly and easily translated along the entire rail. Another benefit of the rails is that they can be purchased directly from a supplier rather than having to be manufactured.

The optical components that are placed onto the rails may include two leveling lasers, two spirit levels 64 and 66, an iris 68 a diverging lens 70, a converging lens 72, a mirror 74 and two targets 76, 78. The components can be attached to the rails by conventional posts and post holders that allow the height of each component to be individually adjusted.

Each of the rails 52, 54 is preferably placed along the rolls 80, 90 to be aligned. The V-shaped legs provide this capability. The legs are preferably adapted to allow the alignment device to be used on different diameter rolls. The legs are preferably machined so that there is only point contact between the legs and the roll to minimize the effects of torsion along the rails. FIG. 3 shows how the rails are mounted onto the rolls and how the optical components are mounted onto the rails. One of the rails (52) will be placed on what will be called the reference roll (80), this being the roll to which one or more other rolls are aligned. The rail placed on the reference roll is designated the "laser rail" 52 and supports the lasers 60, 62. The rail placed on the roll 90 to be aligned is called the "target rail" 54.

The precision spirit levels 64, 66 are preferably mounted on each rail 52, 54 and are used to determine if the roll 90 is level. Commercially available precision spirit levels may be used, for example, that are accurate to 0.1 mm/m.

On the laser rail 52, the two lasers 60, 62 are preferably mounted in a custom machined holder that ensures that each laser beam is parallel to the ground and perpendicular to the center line of the rail. The laser whose beam (60a) strikes the mirror 74 may be referred to as the "alignment laser" 60 and the other laser may be referred to as the "indexing laser" 62.

The beam 60a from the alignment laser 60 travels from the laser rail 52 to the target rail 54 and strikes mirror 74, which is preferably angled at 45 degrees to the centerline of the target rail. The beam is thence redirected down the length of the target rail where it strikes target 76. This target 76 may be referred to as the "far target". The other optical components are preferably placed between the mirror and the far target to improve the sensitivity of the alignment system.

First, after striking the mirror the laser beam preferably passes through adjustable iris 68. The purpose of the iris 68 is to neck down the laser beam so that size of the laser beam on the far target 76 is only a fine point. The size of the laser beam without the iris is approximately ¼ inch across and would be useless in this sort of application. After passing through the iris 68, the laser beam passes through the combination of lenses 70, 72. In this combination of lenses, a diverging lens 70 is used to increase the sensitivity of the system by bending any light rays that do not pass through the center of the lens. A converging lens 72, on the other hand, is used to help focus the laser beam 60a into a fine point. After passing through the combination lens pair 70 and 72, the laser beam 60a from the alignment laser 60 hits the far target 76. If the two rolls 80, 90 are parallel and at the same height, the beam 60a will hit the center of the target 76. However, if the rolls 80, 90 are neither aligned nor at the same height, the beam 60a will be offset from the center of the target 76 (which center may be discernible, for instance, by the intersection of perpendicular crosshairs disposed on the target). The laser beam 62a from the indexing laser 62 also travels between the laser rail 52 and the target rail 54. However, this "indexing" beam 62a is associated with another target 78 on the target rail 54. The purpose of the indexing laser 62 and "indexing" target 78 is to simplify the positioning of the target rail 54 along the length of the target roll 90 and to facilitate the height alignment of the rolls 80, 90.

Although at least one presently preferred embodiment of the present invention contemplates the use of an iris, as discussed above, it is to be understood that this is an optional component that may be left out if considered appropriate. Also, the lenses described above may not even be necessary, as well, if a suitably accurate laser is employed.

The following is a list of steps that could be followed, in accordance with at least one presently preferred embodiment of the present invention, in order to determine if two rolls are aligned with each other. Assume that the constituent components are disposed on the rails as just described and that the rails have been calibrated.

1.) Place the laser rail onto the reference roll to which all other rolls will be aligned and center the rail along the axis of the roll.

2.) Place the target rail onto the roll that is to be aligned and center the rail along the axis of the roll.

3.) Check to see if the level on each rail is reading perfectly level. If both rails are not perfectly level, the rolls are not properly crowned or not perfectly horizontal.

4.) Verify that the indexing laser beam is hitting the mirror target on the crosshairs. If the indexing laser beam is off horizontally, the two rolls are not aligned axially. If the laser beam is off vertically, the two rolls are at different elevations.

5.) Verify that the alignment laser beam is hitting the far target on the crosshairs. If this does not occur, the roll under the target rail must be adjusted until the alignment laser beam hits the crosshairs on the far target.

A special procedure may be followed when rolls are to be calibrated at an angle other than zero relative to one another, that is, when the rolls are at different elevations with respect to one another. Assuming that the angle between the two rolls to be calibrated is unknown, the following procedure is recommended.

1.) Place laser rail on the "calibrated" roll and place target rail on roll to be calibrated.
2.) Strap down the. V-shaped legs on the rails by stretching, e.g., bungee cord around the roll and through holes near the bottom of the legs.
3.) Turn on the indexing laser.
4.) Reposition the laser rail and the target rail until the laser hits the indexing target on the target rail.
5.) Check the angle of both rails. If they are the same, skip to 7 below.
6.) If the angle is different, adjust one or both rails to the same angle while trying to get the laser point as close to the center of the indexing target as possible.
7.) Once the angles are the same, turn on the second laser and follow the same procedure as before when both rails are horizontal.

For angle measurement, an appropriate device (such as a Starett Angle Meter with a 360° scale) may be used on each rail.

Figure 4:
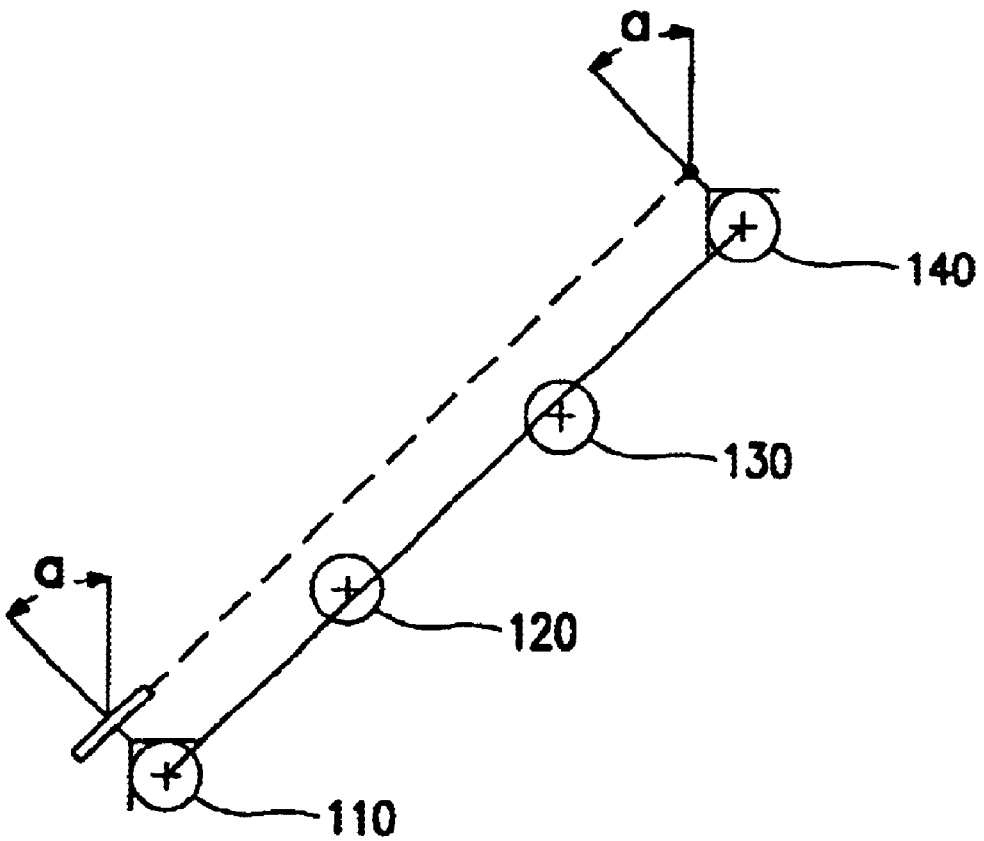
FIG. 4 is a schematic depiction of an angled alignment arrangement.

When multiple rolls are at an angle relative to one another and in a line, it is recommended that the last roll in line be calibrated first. FIG. 4 represents this concept.

In FIG. 4 there are four rolls in a line, each at a given angle. Roll 110 has already been calibrated and is the roll that the laser rail is placed on top of. Roll 140, the last rail in line has the target rail placed on top of it. Rolls 120 and 130 are ignored for right now. After following the steps from above, Roll 140 will be properly calibrated, and the angle meters will both read the same angle, a. Rolls 120 and 130 will easily be calibrated since the angle is known. Position the target rail onto rolls 120 and 130 at angle a and align the rolls as if they were on the horizontal plane.

Figure 5:
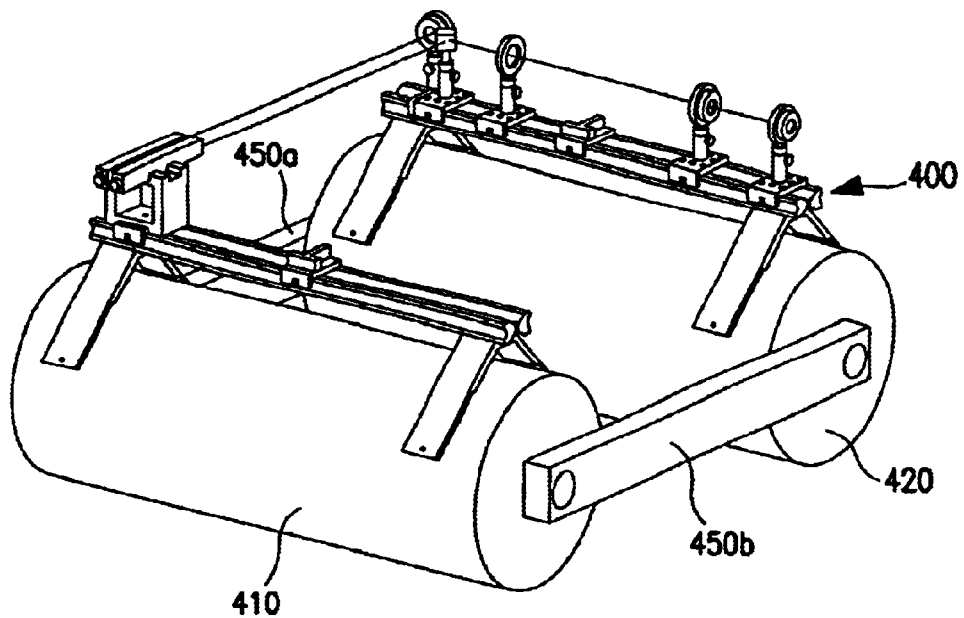
FIG. 5 is a calibration unit.

Also contemplated in accordance with at least one presently preferred embodiment of the present invention is a calibration unit (FIG. 5). The calibration unit is intended to indicate how accurate the system is when it actually rests upon a pair of rolls. As shown in FIG. 5, the calibration unit may-include a pair of rolls 410, 420 that are specially machined to very close tolerances, as well as an alignment system 400 such as that described and illustrated with respect to FIG. 3. Also, rigid bars 450a/b will preferably interconnect to two rolls 410, 420. In this manner, a unit will be produced that will allow one to calibrate the alignment system 400 with great precision prior to its being used in a real operating environment.

To set up a calibration unit, the calibration rolls will preferably rest on a level surface, such as a steel table with adjustable legs. Then, the following procedure may be used.

1.) Mount the laser rail on one cylinder and the target rail on the other cylinder. Use securing means (e.g., bungee cords) to secure the units to the calibration rig.
2.) Use the spirit level on each rail to align the system on top of the calibration rig.
3.) Reposition the targets and mirror to get the lasers to hit the target's crosshairs.
4.) Position the diverging/converging lens to the recommended distance from the alignment target as found by the previous group.
5.) Secure the lock rings on each component to set the correct height.
6.) To double check that the system has been calibrated correctly, switch targets. The lasers should still hit the targets at the crosshairs. If they don't, something is not calibrated correctly.

In recapitulation, the present invention broadly contemplates, in accordance with at least one presently preferred embodiment, accurate, precise and easy to utilize methods and apparatus for aligning rolls. An attendant advantage, in this connection, is that plant workers, not outside specialists (e.g. surveyors), could easily learn to use the laser alignment system themselves and thus minimize unnecessary costs and down time associated with conventional arrangements.

It will be appreciated that rolls that are not all on the same horizontal level can be aligned with one another, even rolls that are positioned vertically with respect to one another. In such non-horizontal applications, it is desirable to utilize an appropriate securing arrangement, such as bungee cords, to hold the V-legs (or other support arrangement) firmly on the rolls themselves.

Essentially any suitable type of laser may be utilized in accordance with the embodiments of the present invention, including small and compact "box" lasers that are commercially available.

It will be appreciated that, by using lasers, it is possible, in the case of a large number of rolls oriented in a row with respect to one another, to designate a single master roll in the row against which all other rolls are aligned. This would then obviate the need to conduct alignments between successive pairs of rolls throughout the roll, thus permitting one rail to remain on the "master roll" throughout the process of aligning several rolls with respect to one another. As many box-type lasers have a functionable range of up to about 300 feet or more, it is thus possible to align quite a large number of rolls in this manner.

Although embodiments of the present invention have been described hereinabove in connection with an arrangement that utilizes two lasers, it is to be understood that an arrangement involving even just one laser is contemplated within the scope of the present invention. Particularly, it is possible to provide only one laser emitting a single beam that thence is split into two beams (analogous to the beams 60a, 62a) via a beam splitter.

If not otherwise stated herein, it may be assumed that all components and/or processes described heretofore may, if appropriate, be considered to be interchangeable with similar components and/or processes disclosed elsewhere in the specification, unless an express indication is made to the contrary.

If not otherwise stated herein, any and all patents, patent publications, articles and other printed publications discussed or mentioned herein are hereby incorporated by reference as if set forth in their entirety herein.

It should be appreciated that the apparatus and method of the present invention may be configured and conducted as appropriate for any context at hand. The embodiments described above are to be considered in all respects only as illustrative and not restrictive. The scope of the invention is defined by the following claims rather than the foregoing description. All changes which come within the meaning and range of equivalency of the claims are to be embraced within their scope.

What is claimed is:

1. Method of aligning rolls, said method comprising:
providing a first structure for being associated with a first roll;
providing a second structure for being associated with a second roll;
providing a laser associated with one of said first and second structures;
providing a target associated with one of said first and second structures; and employing said first structure, said second structure, said laser and said target to indicate whether central longitudinal axes of the first and second rolls are parallel and non-coaxial with respect to one another.

2. The method according to claim 1, wherein said employing step comprises:
mounting said first structure with respect to the first roll;
mounting said second structure with respect to the second roll;
activating said laser to produce a beam; and
ascertaining whether said laser beam arrives at said target in accordance with at least one predetermined criterion, whereby satisfaction of said at least one predetermined criterion corresponds to central longitudinal axes of the first and second rolls being parallel and non-coaxial with respect to one another.

3. The method according to claim 2, wherein said at least one predetermined criterion includes whether said laser beam arrives at a predetermined position on said target.

4. The method of claim 3, wherein said predetermined position is the intersection of crosshairs on said target.

5. The method according to claim 2, further comprising:
providing an arrangement for redirecting a beam from said laser and mounting said redirecting arrangement on one of said first and second structures;
said activating step comprising redirecting said laser beam with said redirecting arrangement;
said ascertaining step comprising ascertaining weather the redirected laser beam arrives at said target in accordance with said at least one criterion.

6. The method according to claim 5, further comprising:
mounting said laser on said first structure; and
said mounting of said redirecting arrangement comprises mounting said redirecting arrangement on said second structure.

7. The method according to claim 6, further comprising the steps of mounting said target on said second structure.

8. The method according to claim 7, wherein:
said step of providing said second structure comprises providing an elongated support structure;
said step of mounting said second structure comprises orienting said elongated support structure in a direction substantially parallel to a longitudinal axis of the second roll;
said mounting of said redirecting arrangement comprises disposing said redirecting arrangement in a manner to direct said laser beam substantially in parallel with respect to said elongated support structure and to said target upon central longitudinal axes of the first and second rolls being parallel and non-coaxial with respect to one another.

9. The method according to claim 5, wherein said redirecting arrangement comprises a mirror.

10. The method according to claim 1, further comprising:
providing an additional target and mounting said additional target on one of said first and second structures;
adapting said additional target to indicate, upon activation of a laser, whether a supplemental aligned condition is fulfilled with respect to the first and second rolls.

11. The method according to claim 10, further comprising:
providing an additional laser;
mounting said additional laser on one of said first and second structures;
activating said additional laser to produce an additional laser beam; and
ascertaining the path of said additional laser beam with respect to said additional target in a manner to determine whether said supplemental aligned condition is fulfilled.

12. The method according to claim 10, wherein:
said first structure comprises a first elongated support structure;
said second structure comprises a second elongated support structure; and
said supplemental aligned condition corresponds to:
said first elongated support structure and said second elongated support structure being disposed at similar longitudinal positions with respect to the corresponding first and second rolls; and
a portion of each of said first and second elongated support structures being disposed at a similar distance to a common plane at which the first and second rolls are each supported, the distance being defined in a direction perpendicular to said common plane.

13. The method according to claim 1, further comprising the step of calibrating at least said laser and said target prior to said employing step.

14. The method according to claim 13, wherein said calibrating step comprises calibrating said laser, said target, said first structure and said second structure in conjunction with third and fourth rolls, the third and fourth rolls having central longitudinal axes already being parallel and non-coaxial with respect to one another.

15. The method according to claim 1, wherein at least one of said first and second rolls comprises a roll for bearing sheet or strip material.

16. The method according to claim 1, wherein at least one of said first and second rolls comprises a roll for bearing sheet metal.

17. Apparatus for aligning rolls, said apparatus comprising:
a first structure for being associated with a first roll;
a second structure for being associated with a second roll;
a laser associated with one of said first and second structures; and
a target associated with one of said first and second structures;
said first structure, said second structure, said laser and said target being adaptable to indicate whether central longitudinal axes of the first and second rolls are parallel and non-coaxial with respect to one another.

18. The apparatus according to claim 17, wherein:
said laser is associated with said first structure; and
said target is associated with said second structure.

19. The apparatus according to claim 17, further comprising an arrangement for redirecting a beam from said laser.

20. The apparatus according to claim 19, wherein:
said laser is associated with said first structure; and
said redirecting arrangement is associated with said second structure.

21. The apparatus according to claim 20, wherein said target is associated with said second structure.

22. The apparatus according to claim 21, wherein:
said second structure comprises an elongated support structure;
said redirecting arrangement is adaptable to direct a laser beam substantially in parallel with respect to said elongated structural member and to said target to indicate whether central longitudinal axes of the first and second rolls are parallel and non-coaxial with respect to one another.

23. The apparatus according to claim 19, wherein said redirecting arrangement comprises a mirror.

24. The apparatus according to claim 17, further comprising:
an additional target associated with one of said first and second structures;
said additional target being adaptable to indicate, upon activation of a laser, whether a supplemental aligned condition is fulfilled with respect to the first and second rolls.

25. The apparatus according to claim 24, further comprising:
an additional laser;
said additional laser being associated with one of said first and second structures;
said additional laser and said additional target being adaptable to indicate whether said supplemental aligned condition is fulfilled.

26. The apparatus according to claim 24, wherein:
said first structure comprises a first elongated support structure; said second structure comprises a second elongated support structure; and
said supplemental aligned condition corresponds to:
said first elongated support structure and said second elongated support structure being disposed at similar longitudinal positions with respect to the corresponding first and second rolls; and
a portion of each of said first and second elongated support structures being disposed at a similar distance to a common plane at which the first and second rolls are each supported, the distance being defined in a direction perpendicular to said common plane.

27. A calibration unit for calibrating apparatus for aligning rolls, said calibration unit comprising:
a first roll;
a second roll;
wherein central longitudinal axes of said first and second rolls are parallel and non-coaxial with respect to one another;
a first structure associated with said first roll;
a second structure associated with the second roll;
a laser associated with one of said first and second structures; and
a target associated with the other of said first and second structures;
said first structure, said second structure, said laser and said target being adaptable to indicate that central longitudinal axes of the first and second rolls are parallel with respect to one another.

28. The calibration unit according to claim 27, further comprising a rigid bar interconnecting and second rolls to maintain the central longitudinal axes of said first and second rolls in parallel and non-coaxially with respect to one another.

29. Method of aligning first and second rolls, said method comprising:
providing a laser;
providing a target;
activating said laser to produce a beam; and
ascertaining whether said laser beam arrives at a predetermined position on said target corresponding to central longitudinal axes of the first and second rolls being parallel and non-coaxial with respect to one another.

30. Method of aligning rolls, said method comprising:
providing a first structure for being associated with a first roll;
providing a second structure for being associated with a second roll;
providing a laser;
providing a target associated with one of said first and second structures;
providing an arrangement for redirecting a beam from said laser and mounting said redirecting arrangement on one of said first and second structures;
activating said laser to produce a beam; and
employing said first structure, said second structure, said laser, said target and said redirecting arrangement to indicate whether central longitudinal axes of the first and second rolls are parallel and non-coaxial with respect to one another.

31. Method of aligning rolls, said method comprising:
supporting a first roll on a non-horizontal surface;
supporting a second roll on the non-horizontal surface;
providing a laser;
providing a target; and
employing said laser and said target to indicate whether central longitudinal axes of the first and second rolls are parallel and non-coaxial with respect to one another.

32. The method according to claim 31, wherein the non-horizontal surface comprises a sloped surface.

33. The method according to claim 1, wherein the first and second rolls are rolls for transporting strip material.

34. The method according to claim 1, wherein said laser is associated with one of said first and second structures, and said target is associated the other of said first and second structures.

35. The apparatus according to claim 17, wherein the first and second rolls are rolls for transporting strip material.

36. The apparatus according to claim 17, wherein said laser is associated with one of said first and second structures, and said target is associated the other of said first and second structures.

37. The calibration unit according to claim 27, wherein the first and second rolls are rolls for transporting strip material.

38. The method according to claim 29, wherein the first and second rolls are rolls for transporting strip material.

39. The method according to claim 30, wherein the first and second rolls are rolls for transporting strip material.

40. The method according to claim 31, wherein the first and second rolls are rolls for transporting strip material.

41. Method of aligning rolls, said method comprising:
providing a first structure for being associated with a first roll;
providing a second structure for being associated with a second roll, said second structure comprising an elongated support structure;
providing a laser;
mounting said laser on said first structure;
providing a target;
mounting said target on said second structure;
providing an arrangement for redirecting a beam from said laser and mounting said redirecting arrangement on said second structure;

employing said first structure, said second structure, said laser and said target to indicate whether said first and second rolls exhibit an aligned condition with respect to one another;

said employing step comprising:
  mounting said first structure with respect to the first roll;
  mounting said second structure with respect to the second roll;
  said step of mounting said second structure comprising orienting said elongated support structure in a direction substantially parallel to a longitudinal axis of the second roll;
  activating said laser to produce a beam and redirecting said laser beam with said redirecting arrangement; and
  ascertaining whether the redirected laser beam arrives at said target in accordance with at least one predetermined criterion, whereby satisfaction of said at least one predetermined criterion corresponds to an aligned condition of the first and second rolls with respect to one another;

said mounting of said redirecting arrangement comprising disposing said redirecting arrangement in a manner to direct said laser beam substantially in parallel with respect to said elongated support structure and to said target upon the first and second rolls exhibiting an aligned condition with respect to one another.

42. Method of aligning rolls, said method comprising:

providing a first structure for being associated with a first roll;

providing a second structure for being associated with a second roll;

providing a laser associated with one of said first and second structures;

providing a target associated with one of said first and second structures; and employing said first structure, said second structure, said laser and said target to indicate whether the first and second rolls exhibit an aligned condition with respect to one another;

providing an additional target and mounting said additional target on one of said first and second structures;

adapting said additional target to indicate, upon activation of a laser, whether a second aligned condition is fulfilled with respect to the first and second rolls;

said first structure comprising a first elongated support structure;

said second structure comprising a second elongated support structure; and said second aligned condition corresponding to:
  said first elongated support structure and said second elongated support structure being disposed at similar longitudinal positions with respect to the corresponding first and second rolls; and
  a portion of each of said first and second elongated support structures being disposed at a similar distance to a common plane at which the first and second rolls are each supported, the distance being defined in a direction perpendicular to said common plane.

43. Apparatus for aligning rolls, said apparatus comprising:

a first structure for being associated with a first roll;

a second structure for being associated with a second roll;

a laser associated with one of said first and second structures; and a target associated with one of said first and second structures;

said first structure, said second structure, said laser and said target being adaptable to indicate whether the first and second rolls exhibit an aligned condition with respect to one another;

an additional target associated with one of said first and second structures;

said additional target being adaptable to indicate, upon activation of a laser, whether a second aligned condition is fulfilled with respect to the first and second rolls;

said first structure comprising a first elongated support structure;

said second structure comprising a second elongated support structure; and said second aligned condition corresponding to:
  said first elongated-support structure and said second elongated support structure being disposed at similar longitudinal positions with respect to the corresponding first and second rolls; and
  a portion of each of said first and second elongated support structures being disposed at a similar distance to a common plane at which the first and second rolls are each supported, the distance being defined in a direction perpendicular to said common plane.

* * * * *